Nov. 4, 1924.

C. KITCHEN ET AL 1,514,533

MOLDING FORM

Filed Dec. 18, 1923

Inventor
C. Kitchen
G. C. Kitchen

Nov. 4, 1924.                      1,514,533
C. KITCHEN ET AL
MOLDING FORM
Filed Dec. 18, 1923      2 Sheets-Sheet 2
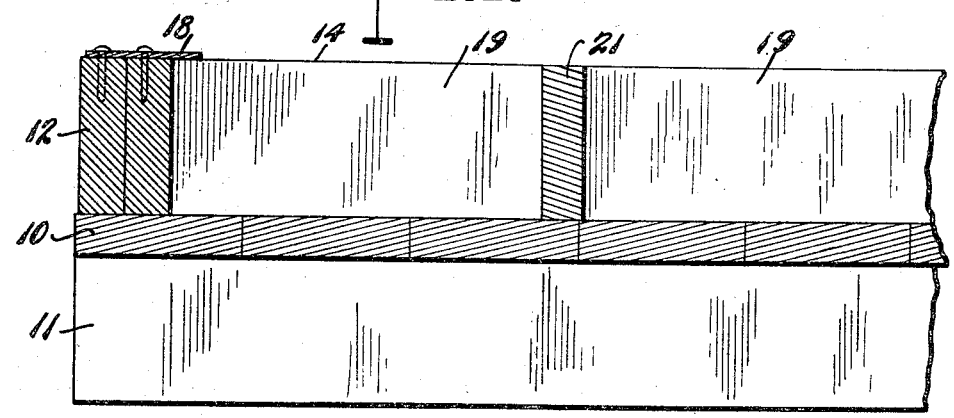
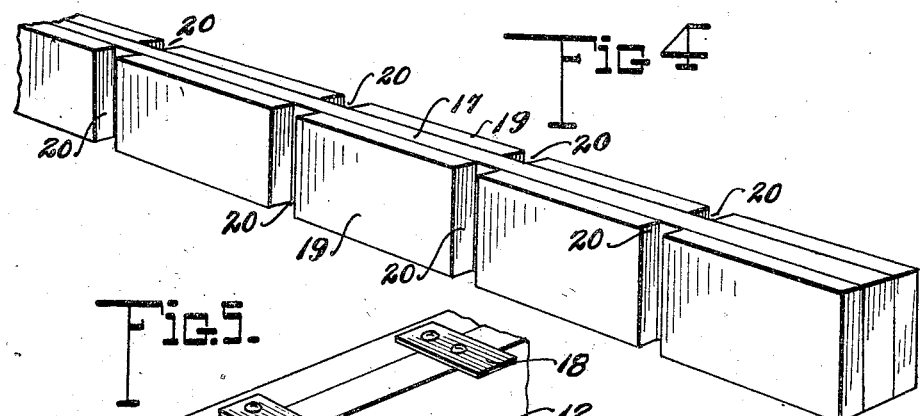
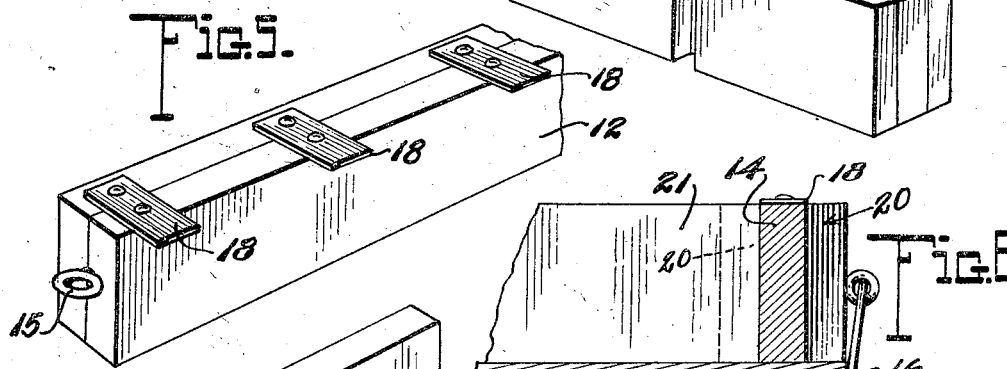
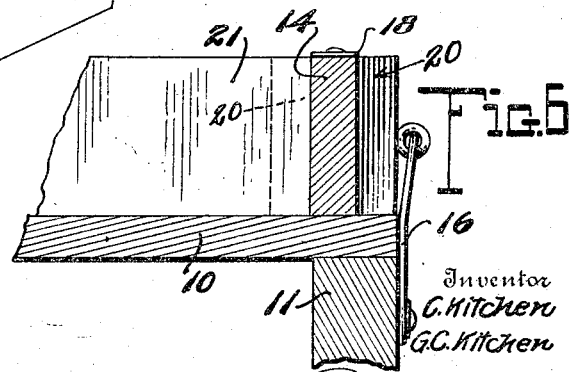
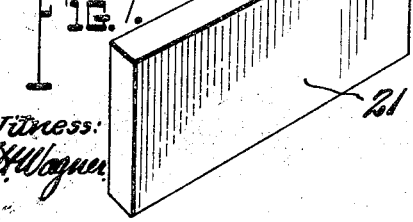

Patented Nov. 4, 1924.

1,514,533

UNITED STATES PATENT OFFICE.

CLAIRE KITCHEN AND GROVER C. KITCHEN, OF SANTA CRUZ, CALIFORNIA.

MOLDING FORM.

Application filed December 18, 1923. Serial No. 681,442.

*To all whom it may concern:*

Be it known that we, CLAIRE KITCHEN and GROVER C. KITCHEN, citizens of the United States, residing at Santa Cruz, in the county of Santa Cruz and State of California, have invented certain new and useful Improvements in Molding Forms, of which the following is a specification.

This invention relates to a brick molding form, and particularly to a construction for the production of a plurality of bricks of any desired size from a plastic mixture of cement and sand, or other suitable material.

In prior construction provision has not been made for the expansion and contraction of the form due to the presence of moisture in the molded material which is evaporated in the curing or drying of the molded article. In such molding operation it has been found desirable to mount the side walls of the molds for free expansive and contractive movement so that as the article dries the mold wall will separate therefrom to permit the access of air for the proper curing of the brick.

The invention has for an object to provide a novel and improved construction comprising a base having side walls retained thereon, and parallel bars provided with opposing faces and freely movable toward and from each other but retained by the side walls against movement away from the base.

A further object of the invention is to provide an improved construction of the parallel bars forming the side walls of the molds by providing the opposing faces thereof with expansion blocks spaced from each other and adapted to receive intermediate removable partitions between their adjacent ends to complete the mold form for the brick.

Other and further objects and advantages of the invention will be hereinafter set forth and the novel features thereof defined by the appended claims.

In the drawings:

Figure 3 is an enlarged detail section on the line 3—3 of Figure 1;

Figure 4 is a detail perspective of one of the bars;

Figure 5 is a similar view of a portion of a side wall;

Figure 6 is an enlarged detail on line 6—6 of Figure 1; and

Figure 7 is a perspective of the end partition.

Like numerals refer to like parts throughout the several figures of the drawing.

Figure 1:
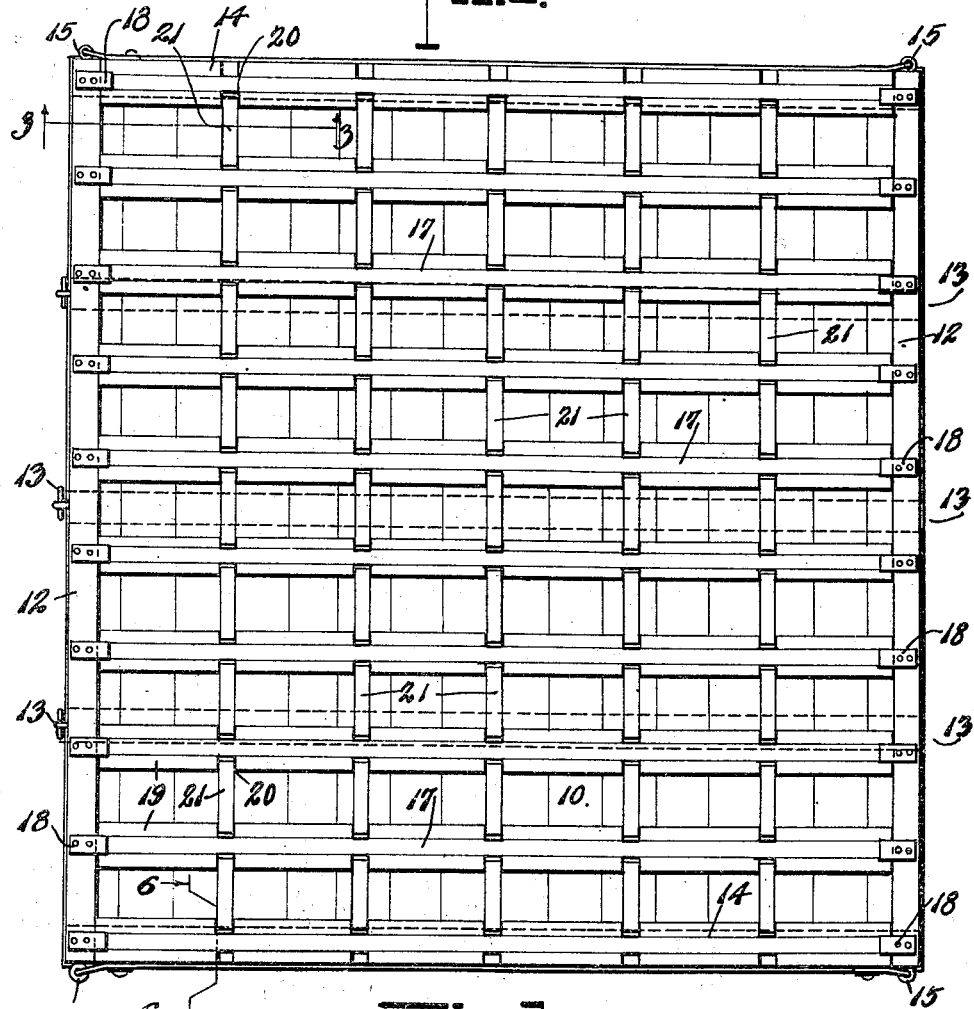
Figure 1 is a top plan of the mold.
Figure 2:
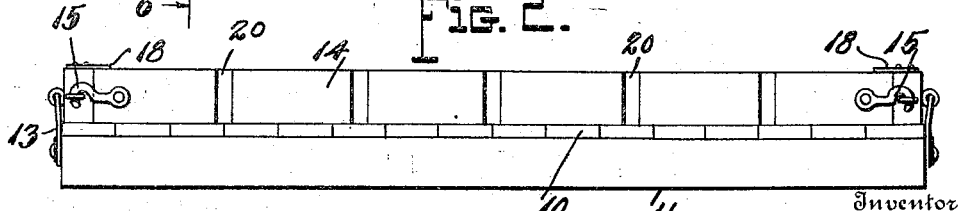
Figure 2 is an end elevation thereof.

The molding form comprising this invention may be constructed of any desired material, preferably wood, and of any size or configuration commensurate with the desired shape or number of bricks to be formed at a single operation. The numeral 10 designates the base or floor of the mold which may be suitably supported upon uprights 11 and is provided at opposite sides with the walls 12 detachably secured to the base in any desired manner, for instance by the fastening devices 13. The ends of these side walls are also connected to the end cross bars 14 by means of a fastening device as shown at 15.

Intermediate of the side walls 12 is a series of parallel bars 17 which are loosely mounted for free expansive and contractive movement toward and from each other but are retained from movement away from the base 10 by means of the plates 18 secured to the side walls 12 and overlapping the ends of the parallel bars. To provide for the expansion of the mold members relative to the expansion and contraction of the material molded, such as the bricks, each of the parallel bars is provided with expansion blocks 19 which form the opposite inner faces of the several molds. These blocks are secured to the cross bars and spaced from each other so as to provide seats 20 adapted to receive the partitions 21 forming the ends of the mold form. These partitions are seated for free removal and the recesses are of sufficient depth to permit the expansion and contraction of the walls without disconnecting the end partitions.

In the operation of the invention the plastic material to be molded is introduced into the mold forms and the liquid therein produces an expansion of the wooden cross bars and partitions which are mounted for movement to accommodate any such expansion. The floor formed of separate strips permits drainage of excess moisture therethrough. In the drying or curing of the molded block or brick the expansion of the plastic material is different from that of the wooden mold, so that these members will slightly separate in order to permit the proper curing of the brick by the access of air to the side walls thereof and much time is saved in the subsequent curing action after the bricks are in condition to be removed from the mold, while the cracking of the bricks which is common in this type of mold is effectually prevented. Molded articles such as bricks formed by this invention may be very cheaply and conveniently produced by unskilled labor and are adapted to largely replace the use of lumber in building operations.

The free mounting of the cross bars permits the formation of bricks of different sizes by the use of end partitions of varying lengths and the parallel bars carrying the expansive blocks are mounted for free movement toward and from each other. The construction permits the ready replacement of any of the blocks of the mold which may become damaged and avoids the necessity in its construction of mortised joints as the mold walls are free for sufficient movement to permit the proper drying of the material to avoid cracking, as frequently occurs in molds of this character.

While the specific construction of the molding form has been shown and described, still it will be obvious that changes may be made in the size and configuration thereof without departing from the spirit of the invention as defined by the following claims.

Having thus described our invention, what we claim as new and desire to secure by Letters Patent is:

1. In a brick forming mold, a platform, side walls retained thereon, parallel bars provided upon opposing faces with expansion blocks and freely movable toward and from each other upon said platform, and removable partitions disposed between the adjacent ends of said blocks.

2. In a brick forming mold, a platform, side walls retained thereon, parallel bars provided upon opposing faces with expansion blocks and freely movable toward and from each other upon said platform, removable partitions disposed between the adjacent ends of said blocks, and means upon the side walls to prevent movement of the parallel bars away from said base while permitting relative movement thereon.

3. In a brick forming mold, a platform, side walls retained thereon, parallel bars provided upon opposing faces with expansion blocks and freely movable toward and from each other upon said platform, removable partitions disposed between the adjacent ends of said blocks, and plates secured to the side walls and overlapping the ends of the parallel bars to prevent withdrawing movement thereof.

4. In a brick forming mold, a platform, side walls detachably secured thereto and to each other, parallel bars provided upon opposite faces with spaced expansion blocks and mounted for free movement toward and from each other upon said platform, and end partitions disposed between said expansion blocks intermediate of the side walls of the mold.

5. In a brick molding form, a platform, a series of parallel bars mounted thereon for movement toward and from each other upon said platform to form the side walls of a mold form, and partitions loosely connected to said parallel bars to provide the end walls of said form.

In testimony whereof we affix our signatures.

CLAIRE KITCHEN.
GROVER C. KITCHEN.